United States Patent
Jacob et al.

(10) Patent No.: US 7,619,771 B2
(45) Date of Patent: Nov. 17, 2009

(54) COLOR CALIBRATION IN A PRINTER

(75) Inventors: Steve A. Jacob, Boise, ID (US); Mark Q. Shaw, Meridian, ID (US); Dennis A. Abramsohn, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 745 days.

(21) Appl. No.: 11/046,056

(22) Filed: Jan. 28, 2005

(65) Prior Publication Data

US 2006/0170991 A1    Aug. 3, 2006

(51) Int. Cl.
*G06F 15/00* (2006.01)
*H04N 1/46* (2006.01)

(52) U.S. Cl. .................. 358/1.9; 358/504

(58) Field of Classification Search ............ 358/518, 358/500, 474, 471, 400, 1.1, 1.13, 509, 1.9; 347/129, 112, 111
See application file for complete search history.

(56) References Cited

U.S. PATENT DOCUMENTS

| | | | |
|---|---|---|---|
| 5,182,721 A * | 1/1993 | Kipphan et al. ............ 382/112 |
| 5,691,817 A | 11/1997 | Cargill et al. |
| RE38,180 E | 7/2003 | Edge |
| 6,830,398 B2 * | 12/2004 | Yokoi .................. 400/582 |
| 6,945,721 B2 * | 9/2005 | Sato .................... 400/708 |
| 7,280,251 B1 * | 10/2007 | Holub .................. 358/1.9 |
| 7,420,705 B2 * | 9/2008 | Yamada et al. ........... 358/1.9 |
| 7,471,415 B2 * | 12/2008 | Ito et al. ............... 358/1.9 |
| 2002/0105674 A1 * | 8/2002 | Normura et al. ......... 358/1.15 |
| 2003/0044210 A1 * | 3/2003 | Mindler et al. ........... 400/1 |
| 2003/0117639 A1 * | 6/2003 | Milton et al. ........... 358/1.13 |
| 2004/0064213 A1 | 4/2004 | Vansteenkiste et al. |
| 2004/0208661 A1 | 10/2004 | Kitagawa et al. |

FOREIGN PATENT DOCUMENTS

JP    2001-045295    2/2001

OTHER PUBLICATIONS

European Search Report; Patent Application No. 06100939.5; Filed Jan. 27, 2006; Report issued Oct. 29, 2007.

* cited by examiner

*Primary Examiner*—Gabriel I Garcia

(57) ABSTRACT

A printer includes a color measurement system. The printer can, in response to a trigger event, automatically calibrate the color measurement system using a first print medium of a first media type.

11 Claims, 11 Drawing Sheets

COLOR CALIBRATION IN A PRINTER

BACKGROUND OF THE INVENTION

There are many different kinds of color input and color output devices. Examples of color input devices include scanners and digital cameras. Examples of color output devices include printers (e.g., inkjet printers, laser printers, offset printers, etc.) and display devices (e.g., CRT devices, video projectors, etc.).

Because many of these devices can interpret colors differently, device color profiles are often used to enable color information to be accurately shared and reproduced across platforms. A color printer, for example, may make use of a color profile to transform color information into the device's own local color space when printing to a particular target media type. The color profile typically accounts and/or corrects for various characteristics of the color printer as well as the target media type. An example of a standardized color profile format is provided by the International Color Consortium (ICC).

A characterization procedure is typically performed to define a new color profile for a color printer. A typical characterization procedure, as applied to a color printer, may involve the use of a pre-defined "characterization target" that includes a number of different color fields each having a known intended color value. The printer prints the characterization target onto one or more sheets of a target print media type and the color value of each printed color field is measured. These measurements, along with the known intended color value of each color field, are subsequently used to define a new color profile that corrects for the target print media type. The color profile may be subsequently used by the printer to transform color information into the printer's own local color space when printing to the target media type.

Unfortunately, performing a characterization procedure to define a new color profile for a printer and media type combination can be both time consuming and complex.

DESCRIPTION

Color Spaces

It is understood that a color can be specified by a set of values (typically three or four values) within a defined color space. For purposes of this document a set of values that specify a color within a defined color space may be referred to generally herein as a set of "color components". Thus, for example, a set of RGB values that specifies a color in an RGB color space may alternatively be referred to herein as a set of "color components" or more specifically as a set of "RGB" color components.

Measured Color Spaces

It is also understood that some color spaces can define a color of an object using the following components:

1. An illumination $I(\lambda)$ of the object;
2. A spectral reflectance $R(\lambda)$ of the object; and
3. A set of pre-defined wavelength functions.

For ease of discussion, a color space that can define a color using these three components may be referred to herein as a "measured color space". The set of pre-defined wavelength functions may generally be referred to herein as the "spectral sensitivity functions" of the color space.

An example of a measured color space is provided by the Commission International de l'Eclairage (CIE) 1931 standard. This standard defines a color in terms of three color component values that are known as tristimulus values.

The tristimulus values X, Y and Z may be calculated as follows:

$$X = \int R(\lambda)I(\lambda)\bar{x}(\lambda)d(\lambda); \qquad \text{eqn. 1}$$

$$Y = \int R(\lambda)I(\lambda)\bar{y}(\lambda)d(\lambda); \qquad \text{eqn. 2}$$

$$Z = \int R(\lambda)I(\lambda)\bar{z}(\lambda)d(\lambda) \qquad \text{eqn. 3}$$

Wherein the $\bar{x}(\lambda)$, $\bar{y}(\lambda)$ and $\bar{z}(\lambda)$ functions are an example of a set of spectral sensitivity functions. More specifically, these particular functions are known as the CIE 1931 color matching functions or "CMF's".

Figure 1:
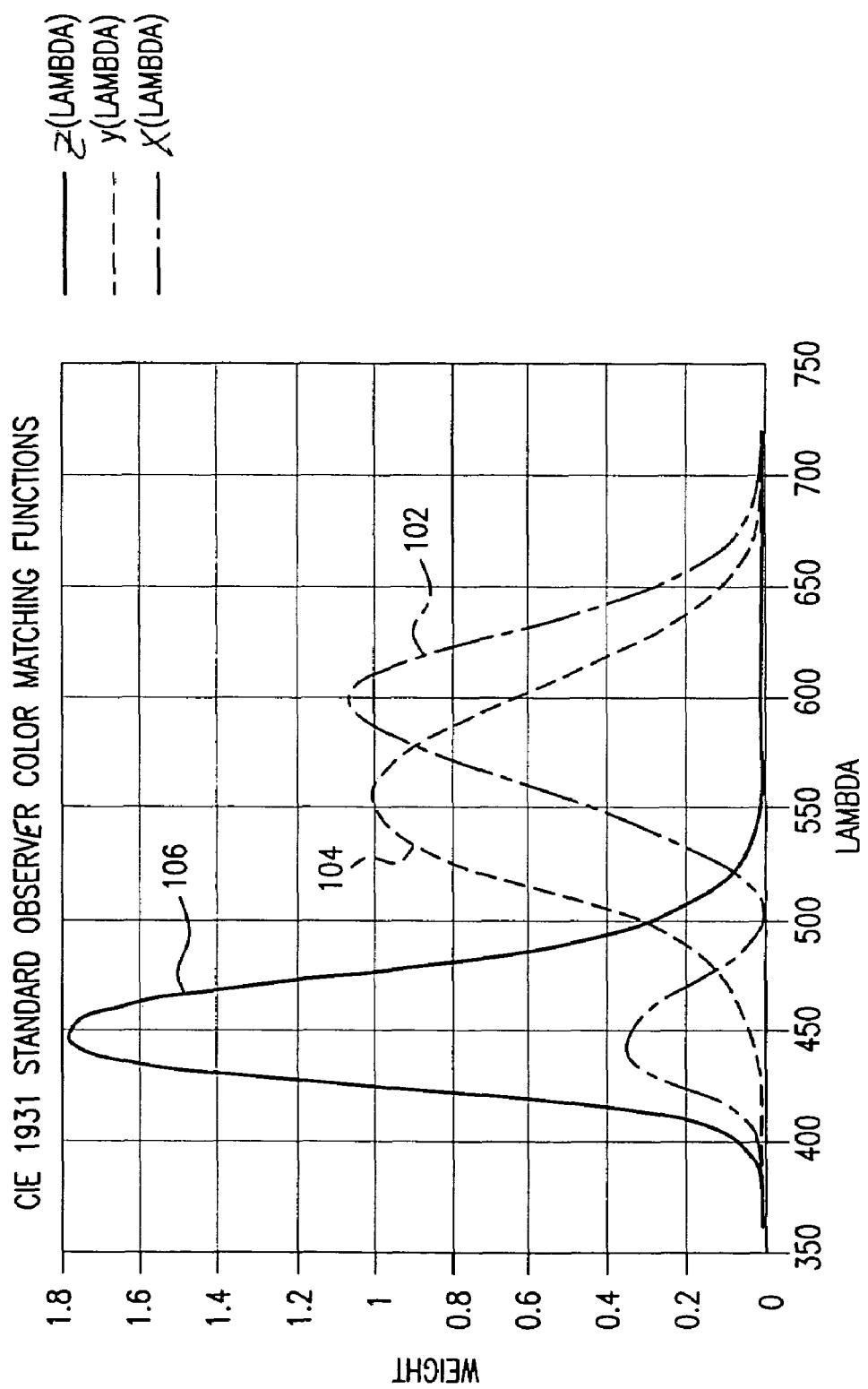
FIG. 1 shows a set of color matching functions.

For the readers reference, FIG. 1 illustrates the CIE 1931 $\bar{x}$, $\bar{y}$, $\bar{z}$ color matching functions wherein:

Curve 102 corresponds to the "$\bar{x}(\lambda)$" color matching function;

Curve 104 corresponds to the "$\bar{y}(\lambda)$" color matching function; and

Curve 106 corresponds to the "$\bar{z}(\lambda)$" color matching function.

Example Computing System

As used herein, the phrase "printer" refers to any device that includes a printing function. Thus, for example, the phrase "printer" may refer to an inkjet printer, a laser printer, a commercial printing press, a multifunction peripheral (MFP) that includes a printing function, etc. The phrase "color printer" refers to any type of printer that can generated color printed output.

Figure 2:
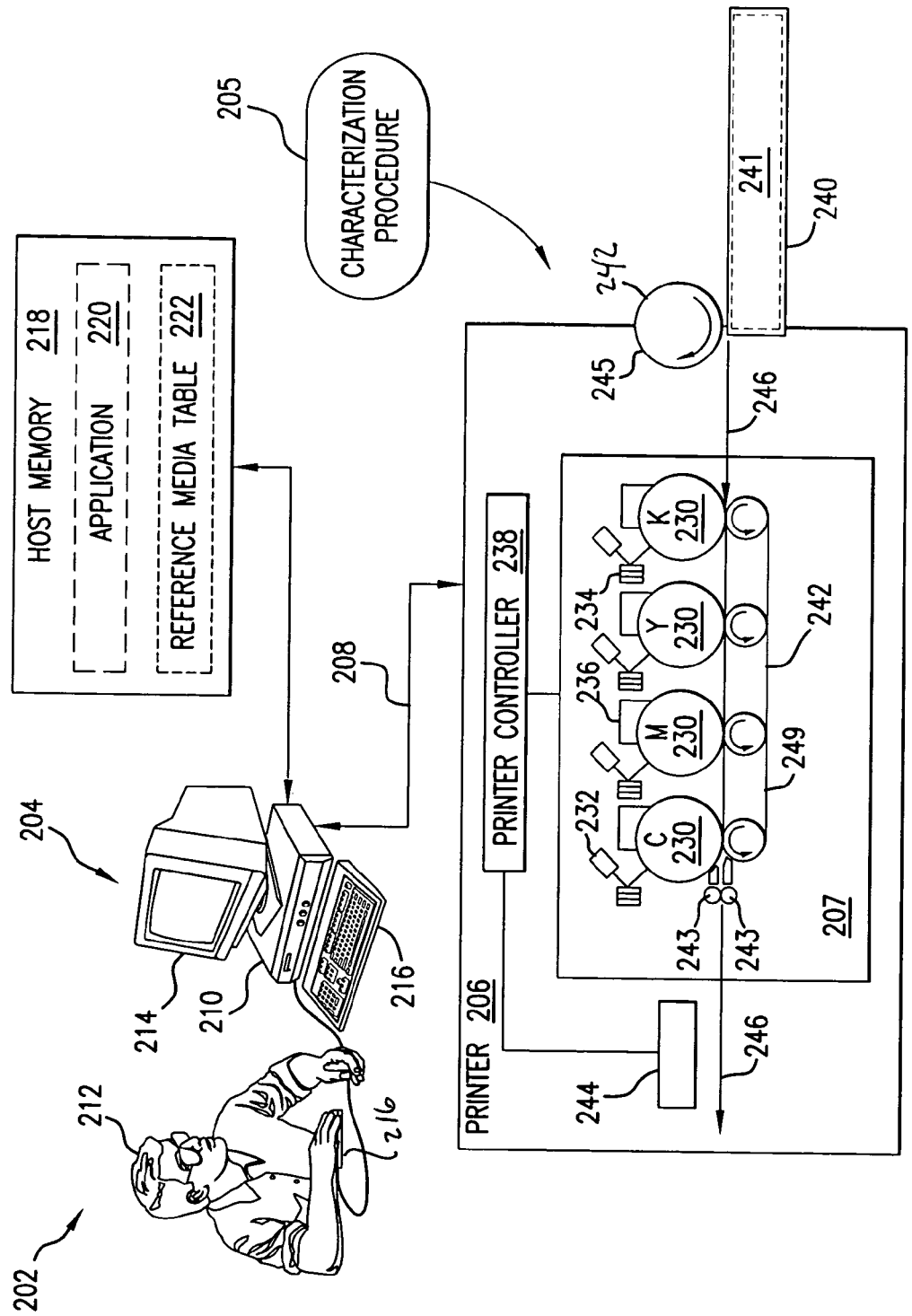
FIG. 2 shows an example of a computing system.

With reference to FIG. 2, shown is an example of a computing system 202 according to an embodiment of the present invention. As shown, the computing system 202 includes a host computer 204 and a color printer 206. The host computer 204 and the printer 206 are connected via a communication link 208. In this example, the communication link 208 is a network, such as an intranet for example.

The host computer 204 includes a central processing unit (CPU) 210, and one or more user interface devices that allow a user (e.g., a user 212) to interact with the host computer 204. The one or more user interface devices include, in this example, a display monitor 214 and a keyboard/mouse 216.

As shown, the host computer 204 further includes a memory 218. Stored in the host memory 218 is a software application 220 and a reference media table 222. As discussed further below, the host software application 220 enables a user of the host computer 204 to set-up and then initiate a characterization procedure 205 on the printer 206. An example embodiment of the host computer 204 operation while executing the host software application 220 is described below with reference to FIG. 5. An example embodiment of the characterization procedure 205 is described below with reference to FIG. 7.

The reference media table 222 specifies the color of certain pre-selected "reference" media types that may be used as a "reference medium" in the characterization procedure 205. As described further below, the characterization procedure 205 uses a reference medium to calibrate a colorimeter 244 located within the printer 206. The colorimeter calibration is accomplished immediately prior to using the colorimeter 244 to measure color fields in a characterization target.

In this example, the color of each reference media type included in the table 222 is specified by a set of XYZ tristimulus values. The reference media table 222 includes, for example, an entry that specifies the media type known as "HP BRIGHT WHITE PAPER" and a corresponding set of pre-determined XYZ tristimulus values that describe the color of this particular type of print medium. The reference media table 222 may include a number of other entries that specify the color of other reference media types that can be used by the characterization procedure 205 to calibrate the calorimeter 244.

Example Printer Construction

The printer 206 includes various components that enable it to generate printed output. In this example, the printer 206 includes a print engine 207 that implements an electro-photographic process to generate color printed output. In this respect, the print engine 207 includes apparatus to deposit four differently colored toners onto a sheet of print medium traveling along a media path 246.

In particular, the print engine 207 includes a set of four photoconductive drums 230 one for each color toner employed by the printer 206. In this example, such colors are Cyan (C), Magenta (M), Yellow (Y) and Black (K). Associated with each photoconductive drum 230 is a laser 232, an optics system 234 and a toner cartridge toner developer station cartridge 236.

The printer 206 further includes, in this example, various other components including a printer controller 238, a media tray 240 capable of holding a stack of print media 241, a media transport system 242, a toner fusing system 243, and the colorimeter 244

The media transport system 242 enables the printer 206 to pick a sheet from the top of the media stack 241 and to advance the picked sheet along the pre-defined media path 246. Accordingly, the media transport system 242 may include a sheet picking device 245 and various other mechanisms (e.g., a transport belt 249) for advancing the picked sheet along the media path 246.

Generally speaking, in order to print on a sheet of print medium, the printer controller 238 directs the operation of the lasers 232 to place a latent image onto the respective photoconductive drums 230. Colored toner (e.g., CMY or K) obtained from the respective toner developer station cartridges 236 is applied to each respective latent image to create toned latent images.

In conjunction with the toned latent images being created, the media transport system 242 can pick the top sheet from the media stack 241 and transport the picked sheet through the media path 246. As the sheet is transported along the media path 246, the toned latent images are transferred sequentially to the sheet-thereby creating a multi-color image on the sheet. The multi-color image is then fused to the sheet by the fusing system 243.

The configuration described above of the printer 206 is just one of any number of possible printer configurations and is described only to provide a framework for the following discussion. It is understood that a printer that embodies the invention is not restricted to any particular configuration. For example, a printer that embodies the invention may have more than one media tray.

It is further noted that printers that do not use an electrophotographic process to generate printed output may embody the invention. For example, an inkjet printer and/or a commercial printing press may also embody the invention.

Colorimeter Construction

Figure 3:
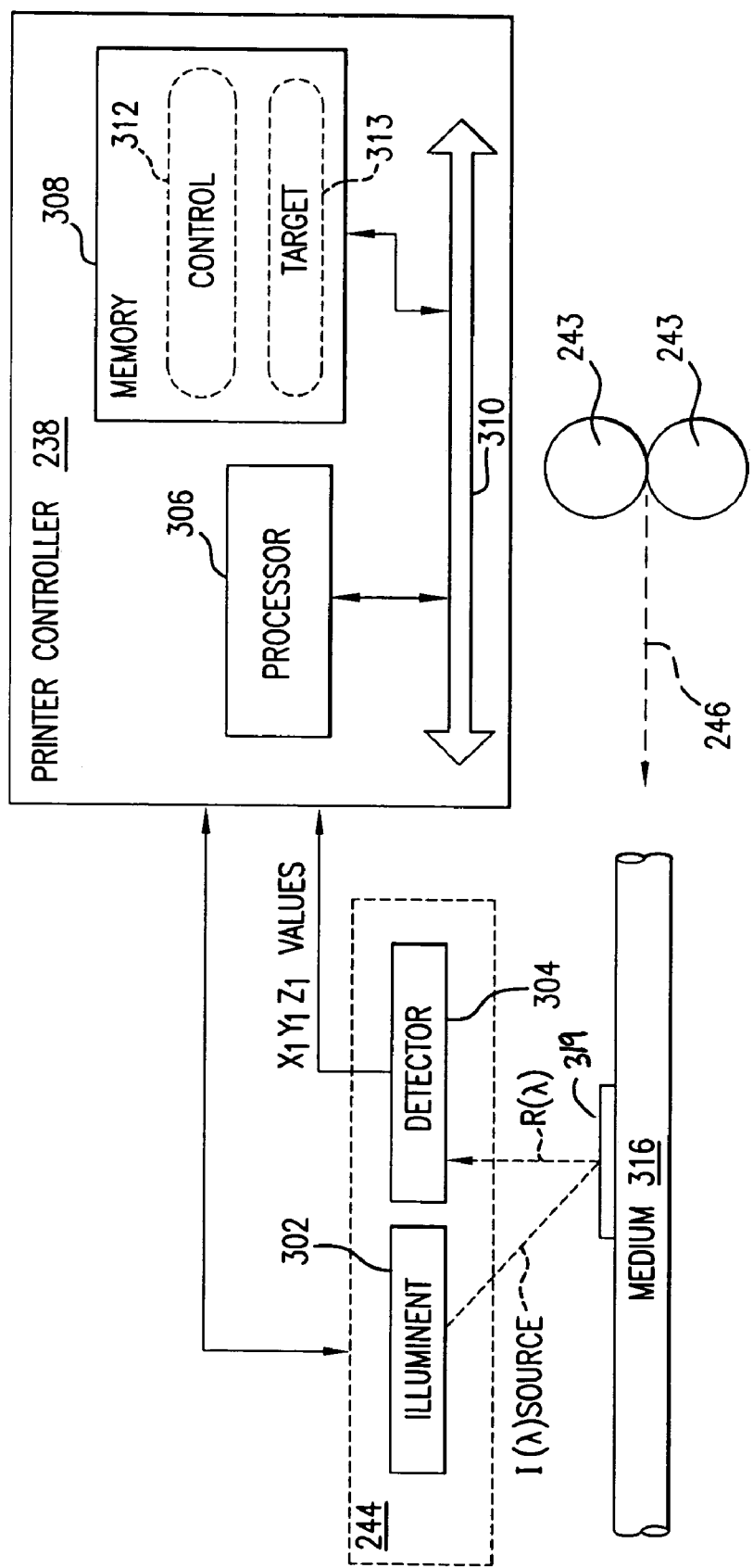
FIG. 3 shows an example of a printer controller.

FIG. 3 illustrates further the printer controller 238 and the colorimeter 244 construction according to an embodiment of the invention. The calorimeter 244 includes, in this example, an illuminant source 302 (e.g., a light emitting diode) and a light detector 304 (e.g., a photodiode and an optical filter system).

The colorimeter 244 may be used to measure the color of an area on a sheet of print medium after the area has exited the toner fusing system 246. FIG. 3 shows, for example, the calorimeter 244 presently measuring the color of a printed area 319 on a print medium 316 after the printed area 319 has exited the toner fusing system 243. In this respect, the illuminant source 302 produces illumination energy ($I_{source}(\lambda)$) that is reflected ($R(\lambda)$) from the printed area 319.

The reflected energy (after passing through the optical filter system of the calorimeter) is detected by the light detector 304. The light detector 304 responds by outputting, to the printer controller 238, a set of XYZ tristimulus values that describe the measured color of the printed area 319.

As is appreciated by one skilled in the art, the actual color of the printed area 319 may depend upon a number of factors, including the reflectance properties of the one or more colorants used to print the printed area 319 as well as characteristics, such as reflectance characteristics, of the print medium 316.

For the later discussion, we note that the accuracy of the color measurements produced by the colorimeter 244 may degrade over time. For example, the output ("$I_{source}(\lambda)$") of the illuminant source 302 may drift over time thereby introducing error into the color measurements produced by the colorimeter 244.

As is known in the art, calorimeters can be a relatively low cost color measurement device. Additionally, some colorimeters may include a mechanically accessible white reference tile that is used for self calibration. Typically such a reference tile adds cost and needs to be cleaned on a periodic basis to maintain the desired tile reflectance characteristics. As shown below, the calorimeter 244 of the present embodiment may be implemented without a reference tile (thereby saving additional cost) as calibration of the colorimeter 244 can be achieved using a print medium (in place of a mechanical reference tile) as a calibration reference.

Printer Controller

As shown in FIG. 3, the printer controller 238 includes a processor circuit 306 and a memory 308 each connected to a local bus system 310. Stored in the memory 308 and executable by the processor 306 to control the operation of the printer 206, is a printer control module 312. The printer control module 312 enables the printer 206 to perform the characterization procedure 205 described below.

Characterization Target

Also stored in the printer memory 308 is a characterization target 313. The characterization target 313 is used by the printer 206 to perform the characterization procedure 205 and includes a number of different color fields each having a known intended color value.

Figure 4:
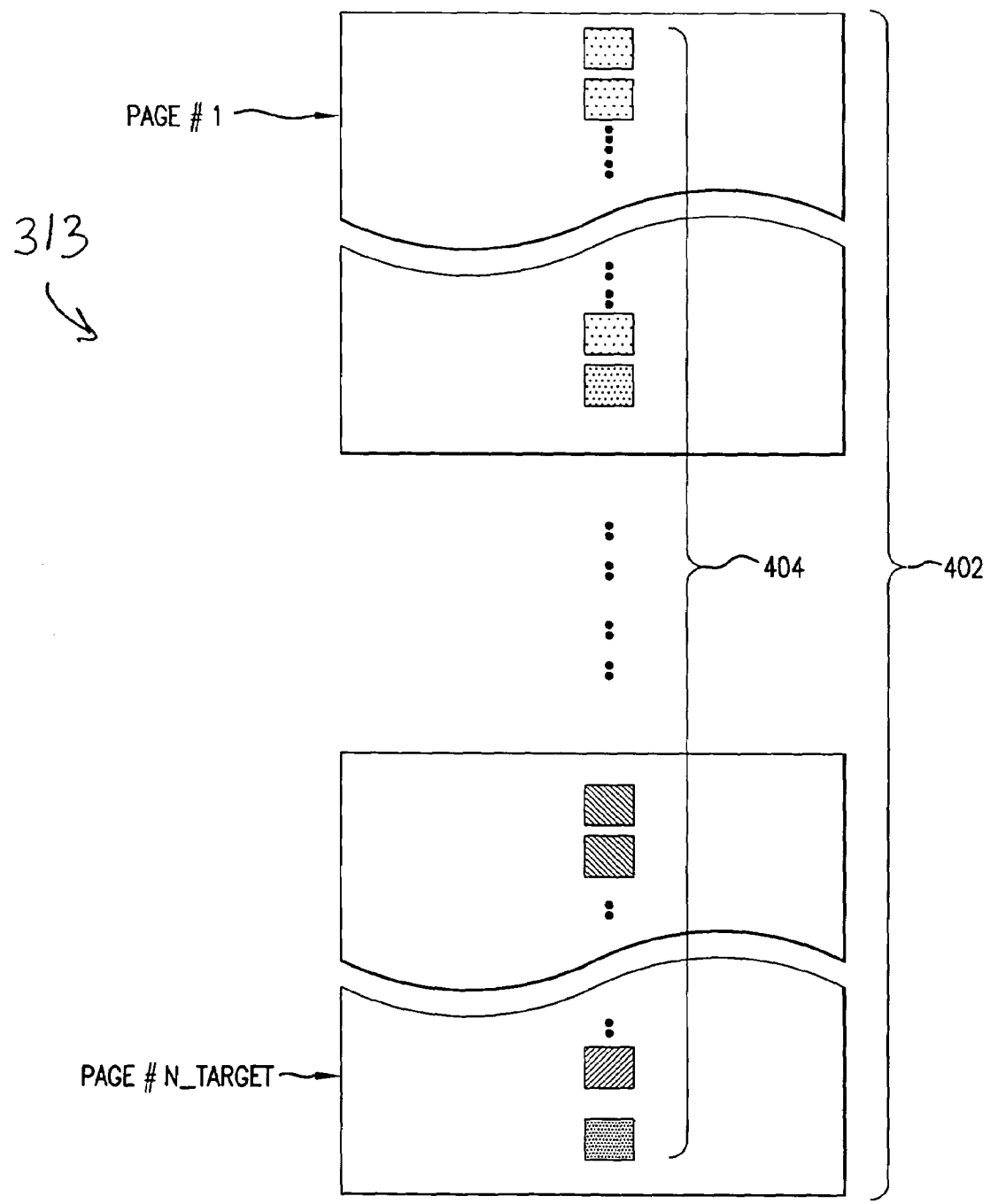
FIG. 4 shows an example of a characterization target.

FIG. 4 illustrates the characterization target 313 as printed on a set of print media sheets 402. As shown, in this example, the printed characterization target 313 includes a set of color fields 404 that span across "N_target" sheets of print media 402, wherein "N_target" represents an integer number of media sheets. As is appreciated by a person skilled in the art, the color fields 404 are arranged spatially in a column so as to permit the colorimeter 244 to measure each of the printed color fields after exiting the fuser system 243. The characterization target 313 may also include registration marks (not shown) that can be sensed by the colorimeter 244. The registration marks may enable one or both of the colorimeter 244 and the printer controller 238 to determine when a printed color field is at an appropriate location with respect to the colorimeter 244 to permit a color measurement.

As is also appreciated by a person skilled in the art, the actual value of "N_Target" is a function of the print medium size (e.g., letter or A4) and the printing orientation (e.g., portrait or landscape) that is used to print the characterization target 313. It is noted for the following discussion that this function is known and the host application 220 is able to determine the number of print medium sheets (i.e., N_target) needed to print the target 313 on any given print medium size and print medium orientation.

User Set-Up of Printer Characterization Procedure

Figure 5:
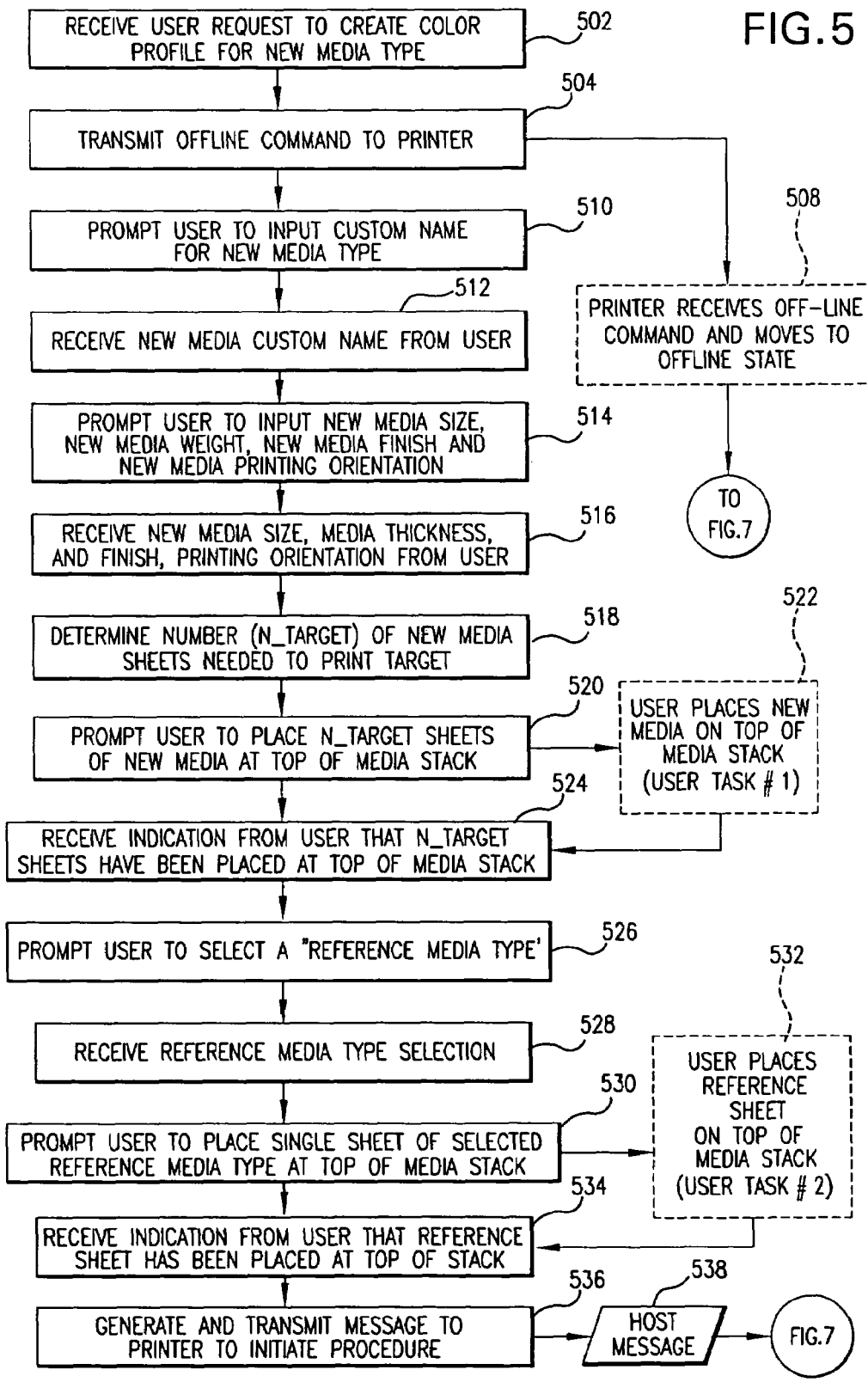
FIG. 5 is a flow diagram illustrating an aspect of a host computer operation according to one embodiment.

FIG. 5 is a flow diagram illustrating an aspect of the host computer 204 operation (as directed by execution of the host application 220) to allow a user 212 to set-up and initiate the printer characterization procedure 205. As the steps in FIG. 5 are discussed, we will (for illustration purposes) assume that the user 212 desires to define a new color profile for a particular new media type. For ease of discussion, we may refer to this particular new media type as the "target media type".

It is also noted that the host computer 204 performs some of the steps described below by prompting the user 212 to input certain information or to perform certain other user tasks. The host computer 204 may "prompt" a user in any number of ways, such as via a graphical user interface (GUI) or by audio instruction, for example. Additionally, the host computer 204 may enable the user 212 to provide the user input described below in any number of ways including via a GUI or by human voice input, for example.

Beginning at step 502, the host computer 204 receives input from the user 212 that indicates he/she desires a new color profile be created by the printer 206 for a new media type (i.e., the target media type).

In response to the user input received at step 502, the host computer 204 transmits (over the network 208) a command (off-line command) to the printer 206 to take the printer 206 off line. The printer receives and responds to the off-line command by moving to an off-line state (step 508).

While in an off-line state, the printer 206 does not accept print jobs and waits for a message from the host computer 204 to initiate the characterization procedure 205. Accordingly, after moving into the off-line state and until a message to initiate the characterization procedure 205 is received, the printer 206 will not transport a print medium sheet from the media tray 240. This allows the user 212 to configure the media stack 241 as described below prior to the characterization procedure 205 being initiated.

In addition to taking the printer off-line, the host computer 204 prompts the user to input a name for the target media type (step 510). At step 512, the user 212 responds to this prompt by inputting a custom name (e.g., "Steve's new media") for the target media type (step 512).

At step 514, the host computer 204 prompts the user 212 to input certain information with respect to the target media type. In this example, the host computer 204 prompts the user to input the size of the target media type (e.g., letter or A4) and a preferred printing orientation (e.g., portrait or landscape) for printing the characterization target 313. The host computer 204 may also prompt the user to indicate the target media weight and the target media finish at this step.

At step 516, the user 212 responds by providing input that specifies the size of the target media type (e.g., letter), the target media weight, the target media finish and a preferred printing orientation (e.g., portrait) for printing the characterization target 313.

At step 518, the host computer 204 determines the number (i.e., "N_target") of media sheets of the target media type needed to print the characterization target 313. This determination is based upon the size of the target media type and the preferred printing orientation that was specified (by the user) at step 516. In this example, we will assume that the host computer 204 determines that three media sheets of the target media type are needed to print the characterization target 313.

At step 520, the host computer 204 prompts the user to place "N_target" (i.e., three) media sheets of the target media type at the top of the media stack 241. At step 522, the user 212 performs this task and thereby places a set of three media sheets 604 (illustrated below in FIG. 6) of the target media type at the top of the media stack 241. At step 524, the user 212 then provides input to the host computer 204 that indicates he/she has completed this particular task.

At step 526, the host computer 204 then prompts the user 212 to select a reference medium type that is listed in the reference media table 222. At step 528, the user 212 selects a reference medium type listed in the table 222 (step 528). In this example, we will assume that the user 212 selects "HP BRIGHT WHITE PAPER" at step 528.

At step 530, the host computer 204 prompts the user to place a single sheet (reference sheet) of the user selected reference medium type (i.e. HP BRIGHT WHITE PAPER) at the top of the media stack 241. At step 532, the user 212 performs this task and thereby places a "reference" sheet 602 (illustrated below in FIG. 6) of HP BRIGHT WHITE PAPER at the top of the media stack 241. At step 534, the user 212 then provides input to the host computer 204 that indicates he/she has completed this particular task.

At step 536, the host computer 204 generates and then transmits a message 538 to the printer 204 in order to initiate the printer characterization procedure 205.

The message 538 includes a pre-determined color description (obtained from the reference media table 222) of the selected reference media type. Thus, in this example, the message 538 includes a color description of HP BRIGHT WHITE PAPER. The message 538 also includes, in this example, the user specified name of the target media type and the user specified preferred printing orientation of the characterization target 313. The message 538 may further include the user specified target media weight and the specified target media finish.

Media Stack Configuration

Figure 6:
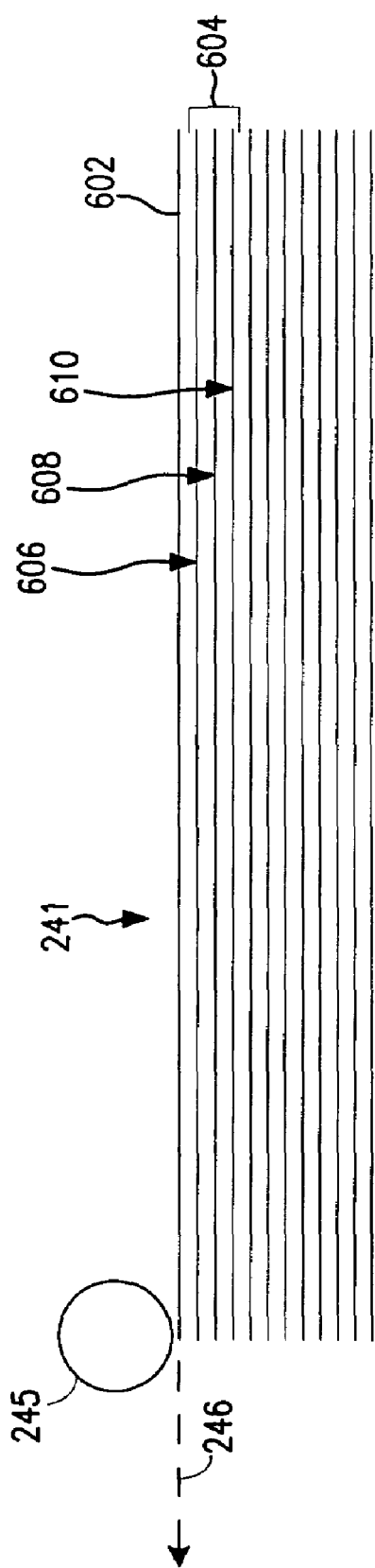
FIG. 6 shows an example of a media stack.

Shown in FIG. 6 is the media stack 241 configuration at the time when the host computer 204 transmits the message 538 to the printer 206. As shown, the reference sheet 602 of HP BRIGHT WHITE PAPER is positioned at the top of the media stack 241. The set of three sheets 604 are of the target media type and are positioned immediately below the reference sheet 602.

Printer Operation

Figure 7:
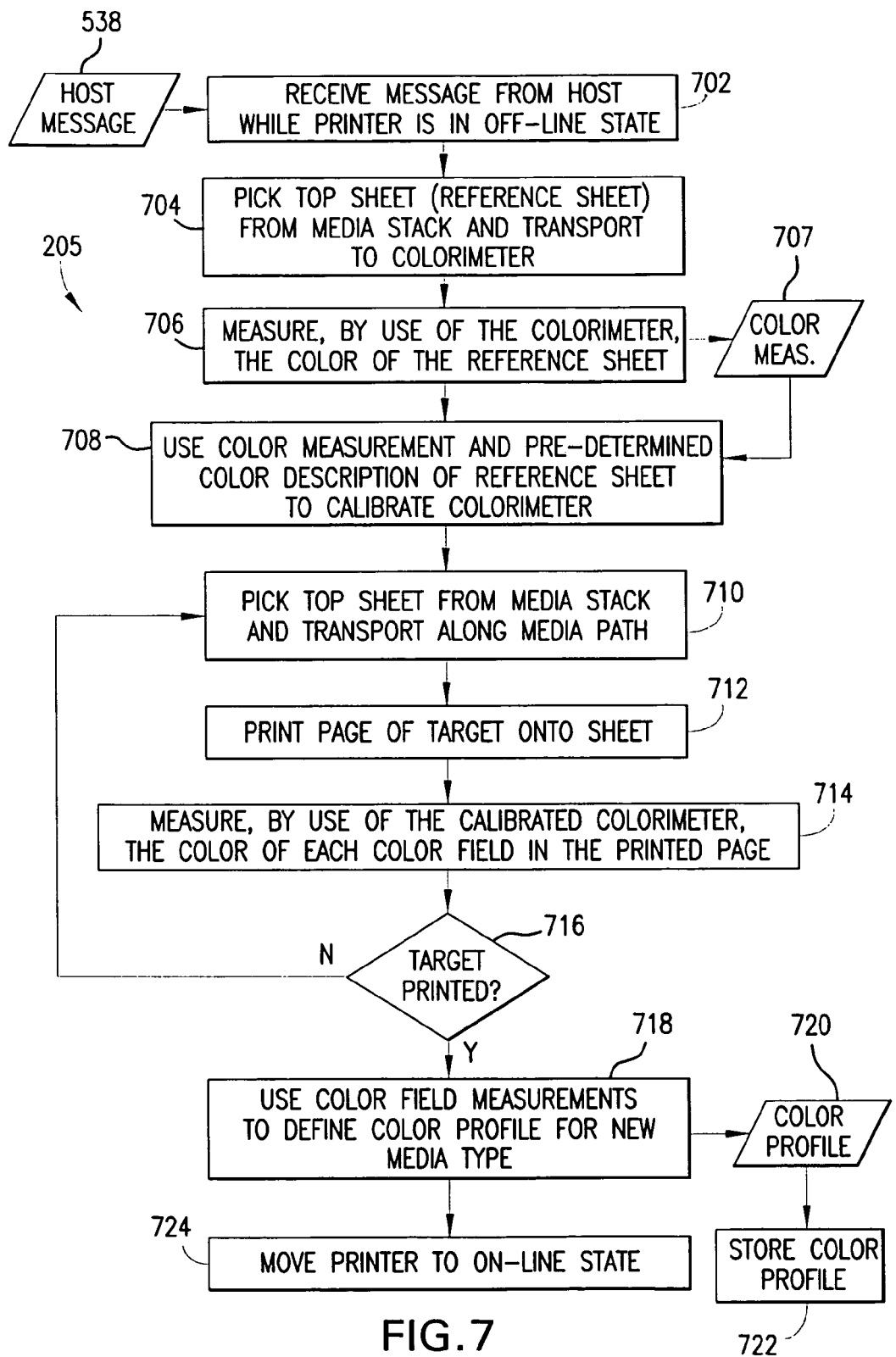
FIG. 7 is a flow diagram illustrating an aspect of a printer operation according to one embodiment.

FIG. 7 is a flow diagram illustrating the operation of the printer 206 to perform the characterization procedure 205 upon receiving the message 538.

Beginning at step 702, the printer 206 (presently in an off-line state), receives the message 538 from the host computer 204 to initiate the characterization procedure 205. In response to the message 538, the printer 206 operates to first calibrate the colorimeter 244 by performing steps 704-708.

At step 704, the printer 206 picks the top sheet (i.e., the reference sheet 602) from the media stack 241 and transports the sheet 602 along the media path 246 to the colorimeter 244. The reader will note that this step leaves the set of three media sheets 604 of the target media type now at the top of the media stack 241. The reader will also note that the reference sheet 602 passes through the print engine 207. The reference sheet 602 is not, however, printed in the present embodiment (although in other embodiments, the reference sheet 602 may indeed be printed).

At step 706, the printer 206 uses the calorimeter 244 to measure the color of the reference sheet 602. This results in a color measurement 707 of the reference sheet 602 being generated by the calorimeter 244. The color measurement 707 being a set of XYZ tristimulus values.

At step 708, the printer 206 calibrates the calorimeter 244 based upon the reference sheet color measurement 707 and the pre-determined color description of HP BRIGHT WHITE PAPER included in the message 538. The calibration step may be accomplished, for example, by determining an adjustment to the power applied to the calorimeter illuminant source 302 in order to compensate for drift in the illuminant source output (i.e., "$I_{source}(8)$"). The adjusted power is then applied to the colorimeter 244 when subsequent color measurements are performed.

It is noted that in other embodiments, the calorimeter 244 may be calibrated differently. For example, according to one embodiment, a mathematical normalization may be defined based upon the measured color of the reference sheet 602 and a pre-determined color description of the reference sheet color (e.g., the pre-determined color description of HP BRIGHT WHITE PAPER). The mathematical normalization may then be applied to the subsequent color measurements produced by the calorimeter 244. According to yet another embodiment, both a power adjustment to the illuminant source 302 and a mathematical normalization is determined and each is applied to subsequent color measurements.

After the calorimeter 244 is calibrated, the printer 206 then proceeds automatically to pick another media sheet (i.e., the first media sheet 606) from the top of the media stack 241 and to transport this sheet along the media path 246 (step 710). The reader will note that this sheet is of the target media type.

At step 712, the printer 206 prints the first page of color fields in the characterization target 313 onto the first media sheet 606. The first page is oriented in accordance with the user specified (characterization target) printing orientation. Also, the printer 206 may adjust certain printing parameters based upon the user specified media weight and the user specified media finish that was indicated in the message 538. For example, the printer 206 may set (when printing the characterization target 313) the fusing temperature of the toner fusing system 243 based upon this information.

At step 714, the printer 206 measures (using the now calibrated colorimeter 244) the color of each color field printed on the first media sheet 606 and stores these color measurements.

The printer 206 repeats steps 710-714 so as to:
1. Print the second page of color fields from the characterization target 313 on the second sheet 608.
2. Measure (using the calibrated colorimeter 244) the color of each color field printed on the second sheet 608 and to store these color measurements;
3. Print the third (and final) page of color fields from the characterization target 313 on the third media sheet 610;
4. Measure (using the calibrated calorimeter 244) the color of each color field printed on the third sheet 610 and to store these color measurements.

At step 718, the color measurement of each printed color field in the characterization target 313 is used, along with the known intended color of each color field, to define a new color profile 720 for the target media type. We note that in some embodiments, standard techniques may be used to perform this step. In other embodiments, "cross-terms" may be used to augment the information included in the color measurements. The use of cross-terms to augment color field measurements is described further in co-pending application Ser. No. 10/820,954, filed Apr. 7, 2004. That application is incorporated herein by reference.

At step 722, the new color profile 720 is stored in the printer memory 308 under the custom name (e.g., "Steve's new Media") provided by the user 212.

At step 724, after the new color profile 720 is defined, the printer 206 automatically moves from the off-line state to an on-line state so as to enable users to again use the printer 206 for normal printing.

Use of Color Profile

It is noted that after the printer 206 defines the color profile 720, the user 212 can then use the profile to print to the target media type. This can result in improved color reproduction.

According to one embodiment, the user 212 may select an option provided by a print driver to use the new color profile 720 when setting up a print job on the host computer 204. In response to the option being selected, the host computer 204 generates a print job that instructs the printer 206 to use the new color profile 720 to map color information included in the job. The print job may reference the color profile 720 by the custom name (e.g., Steve's new media) originally provided by the user 212.

Other Embodiments

Figure 8:
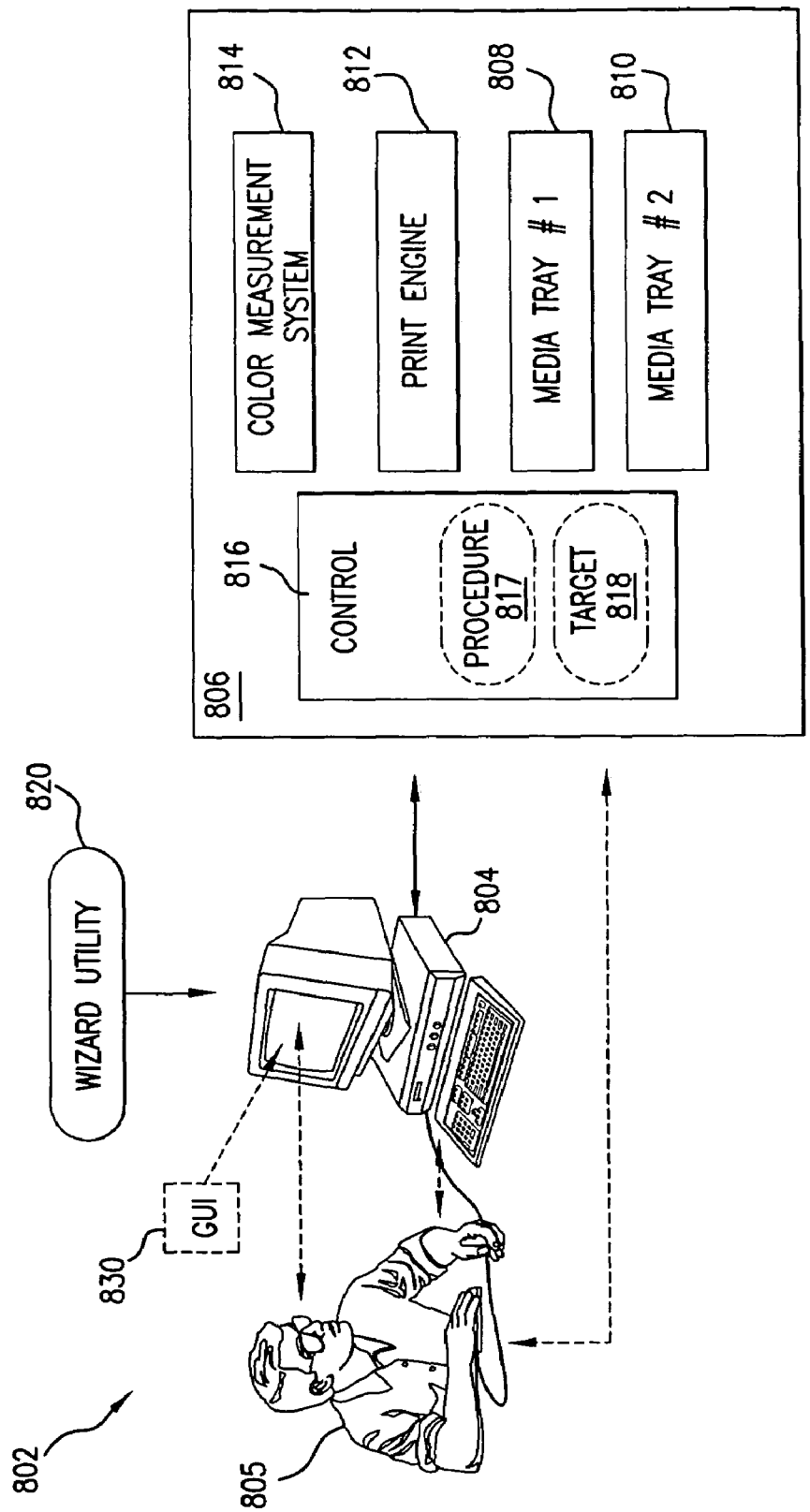
FIG. 8 shows an example of a computing system.

FIG. 8 shows an example of a computing system 802 according to an embodiment of the invention. As shown, the computing system 802 includes a host computer 804 operated by a user 805. The host computer 804 is connected to a printer 806.

The printer 806 includes multiple media trays each for holding a supply of print media. For example, the printer 806 includes a first media tray (media tray #1) 808 and a second media tray (media tray #2) 810.

The printer 806 further includes a print engine 812 and a color measurement system 814 for measuring the color of print media after exiting the print engine 812. The color measurement system 814 may represent any device capable of measuring print medium color. Thus, for example, the color measurement system 814 may represent a calorimeter, a densitometer, etc.

The printer 806 further includes a control system 816 that enables the printer 806 to perform a characterization procedure 817 to define a color profile for a new media type. Similar to the embodiment described above, the characterization procedure 817 uses a reference sheet to calibrate the color measurement system 814 and also involves printing a characterization target 818 on the new media type.

The host computer 804 includes a computer program (wizard utility 820)828 that enables it the computer 804 to display a wizard graphical user interface (GUI) 830. The wizard GUI 830 is for guiding the user 805 through the set-up of the printer characterization procedure 817. In this respect, the wizard GUI 830 enables a user to provide certain input and prompts the user to perform certain tasks associated with the characterization procedure 817.

Figure 9A:
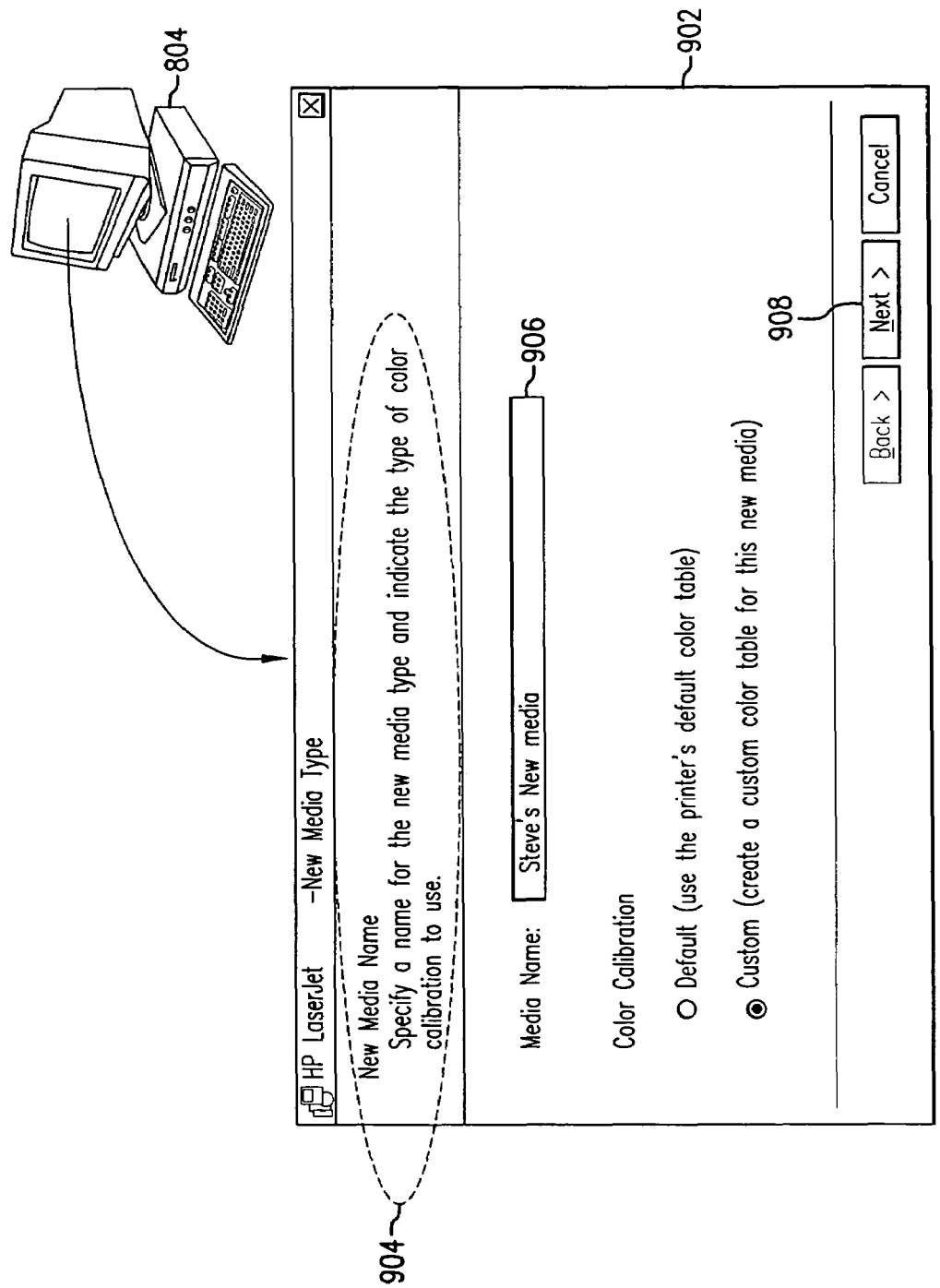
FIG. 9A-C shows an example set of dialog boxes according to one embodiment of a wizard GUI.
Figure 9B:
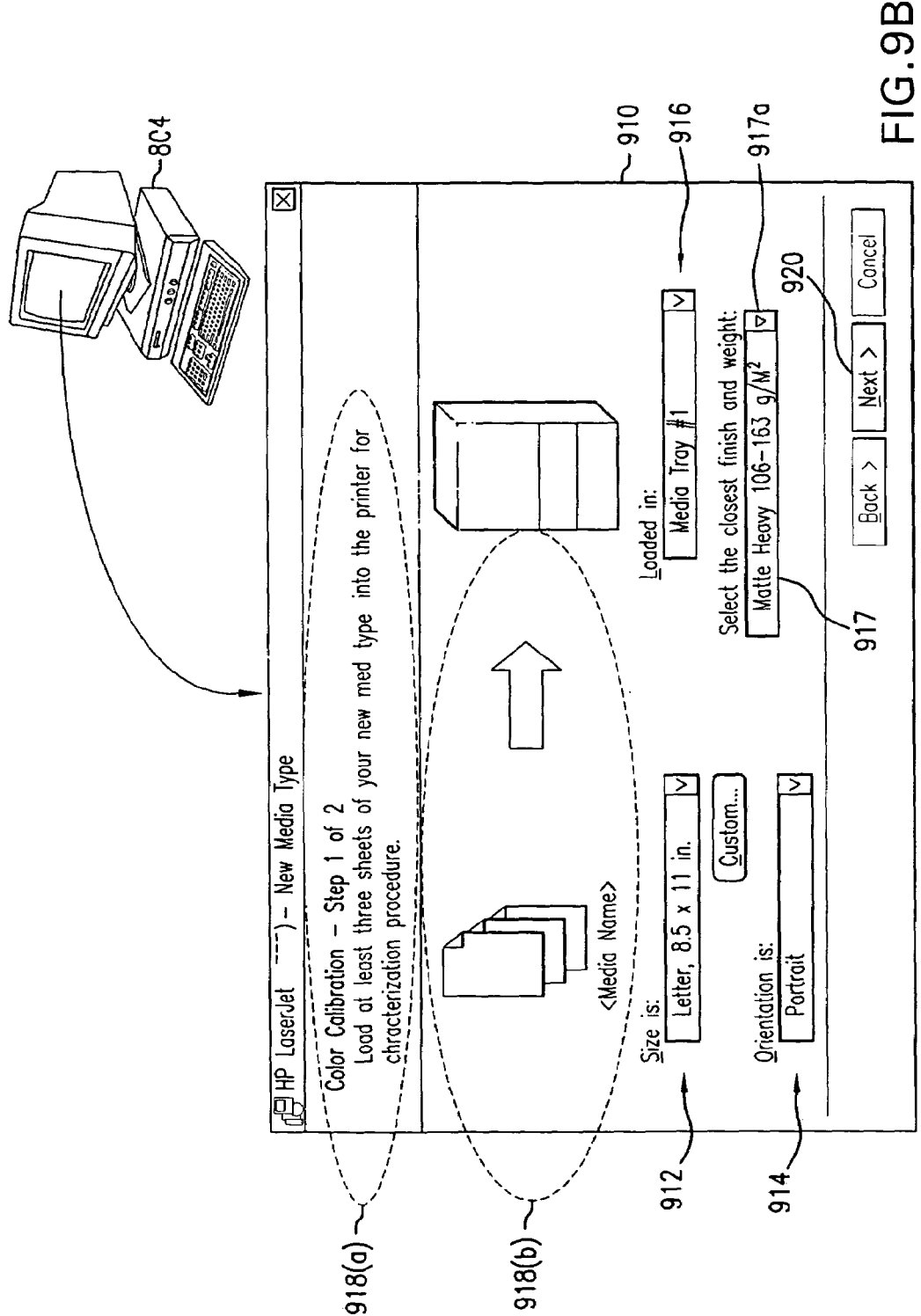
Figure 9C:
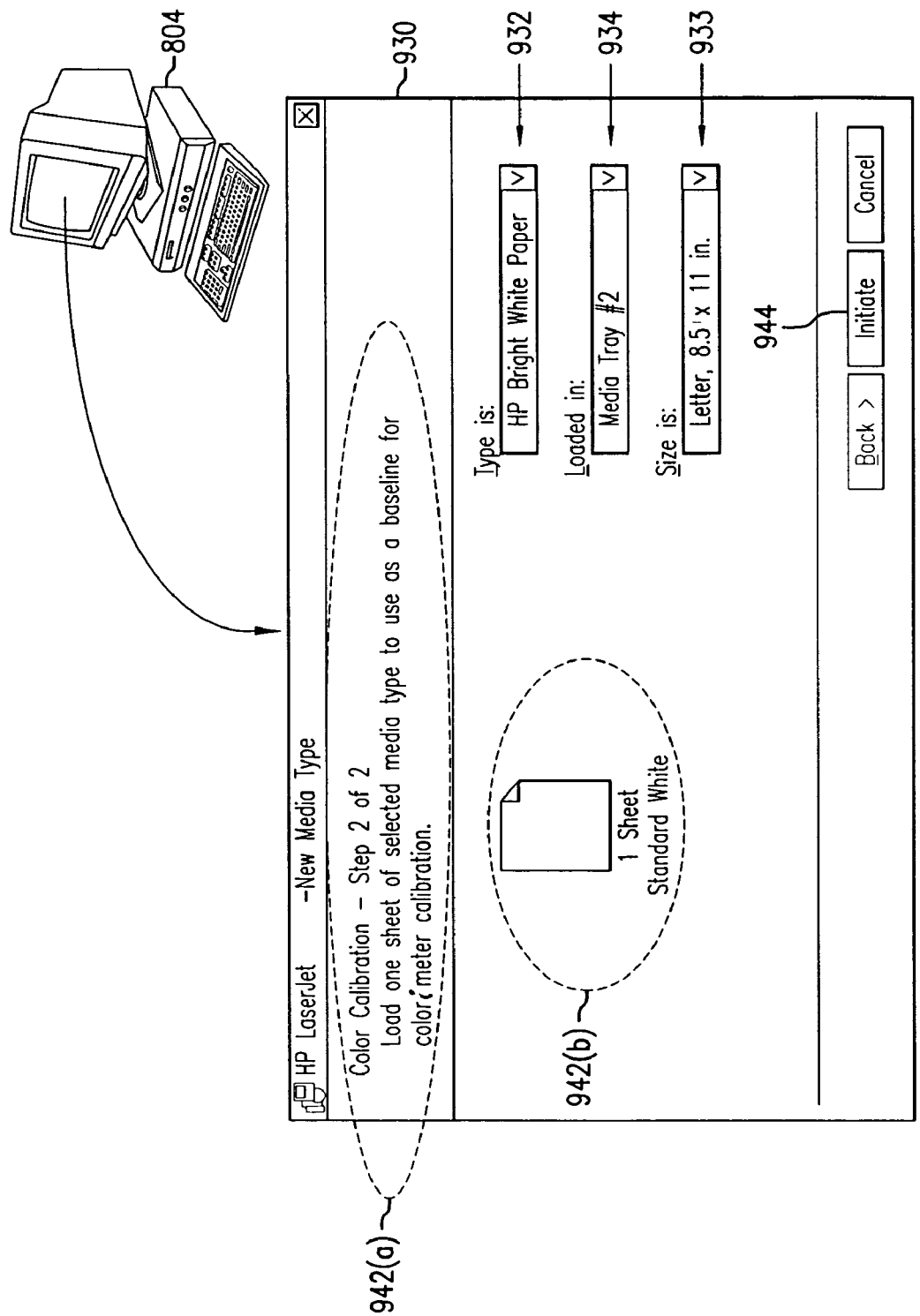

FIG. 9A-C shows an example set of dialog boxes according to one embodiment of the wizard GUI 830. Shown in FIG. 9A, for example, is a first dialog box 902 of the Wizard GUI 830. The first dialog box 902 includes text 904 that prompts the user to input a custom name for the new media type for which the user wishes to create a profile. The user may input the custom name (e.g., Steve's new media) into an input field 906. The printer 806 will store the new color profile under this custom name.

After the user has typed his/her preferred name for the new media type into the input field 906, he/she can select a "next" button 908. Selecting the "next" button 908 causes the host computer 804 to display a second dialog box 910.

FIG. 9B shows the second dialog box 910 of the Wizard GUI 830. As shown, the second dialog box 910 includes:

1. An input field 912 that enables a user to specify the size of the new media type (e.g., letter);
2. An input field 914 that enables a user to specify a preferred new media type printing orientation (e.g., portrait);
3. An input field 916 that enables a user to select a preferred media tray (e.g., media tray #1) to load the new media type for printing of the characterization target 818; and
4. An input field 917 that allows a user to specify a new media type finish and new media type weight. The reader will note that, in the present embodiment, input field 917 is implemented as a pull down menu. Selecting an arrow 917(a) results in a pre-determined list of media finish/weight combinations. The user can select the finish/weight combination (e.g., "matte heavy 106-163 g/m$^2$") that he/she believes is closest to the new media type. This information may subsequently be used by the printer 806 to set various printing parameters when printing the characterization target 818.

The second dialog box 910 also prompts the user to place enough sheets (i.e., "N_target") of the new media type in the user selected media tray (e.g., media tray #1) so as to enable the printer 806 to print the characterization target 818 on the new media type. In the example shown, we again assume N_target is three although in other implementations N_target may be any appropriate value.

The reader will note that the second dialog box 910 prompts the user to place the new media type in the selected tray via text 918(a) and also by a graphic 918(b). The graphic 918(b) conveys graphically (as opposed to textually) the number of sheets that is to be placed in the user selected media tray. After the user has performed this task, he/she can then select the "next" button 920. Selecting the "next" button 920 causes the host computer 804 to display a third dialog box 930.

FIG. 9C shows the third dialog box 930 of the Wizard GUI 830. As shown, the third dialog box 930 includes:

1. An input field 932 that enables a user to select a reference media type (e.g., HP BRIGHT WHITE PAPER) from a list of reference types each having a known color;
2. An input field 933 that enables a user to specify a size of the selected reference media type (e.g., letter); and
3. An input field 934 that enables a user to select the media tray he/she wishes to load a reference sheet of the reference media type.

The third dialog box 930 also prompts the user to place a single sheet (reference sheet) of the reference media type in the user selected media tray. Note that the third dialog box 930 prompts the user to perform this task by text 942(a) and also by a graphic 942(b). After the user has performed this task, the user can then select an "Initiate" button 944 to initiate the characterization procedure 817.

Selecting the initiate button 944 causes the Wizard utility 820 to transmit a message to the printer 806 so as to initiate the characterization procedure 817. The message includes the user input specified by the user via the three dialog boxes 902, 910, 930.

The printer 806 is responsive to the message from the host 804 by performing the characterization procedure 817 in accordance with the user input. In particular, the printer 806 first calibrates the color measurement system 814 using the top sheet from the media tray selected by the user via input field 934 (dialog box 934). The reader will note that this sheet is the reference sheet assuming the user followed the Wizard GUI instructions (i.e., prompt 942(a), 942(b)). The printer 806 transports this sheet to the color measurement system 814, measures the color of the sheet and compares the resulting color measurement to a pre-determined reference color description. The reference color description being the known color of the reference media type that was selected by the user via input field 932 (dialog box 934). Based upon the comparison, the printer 806 calibrates the color measurement system 814.

The printer 806 then proceeds to print the characterization target 818 using media sheets obtained from the media tray selected by the user via input field 916 (dialog box 910). The reader will note that these sheets are of the new media type assuming the user followed the Wizard GUI instructions (i.e., prompt 918(a), 918(b)). The printer 806 uses the calibrated color measurement system 814 to measure each color field printed on these sheets. Based upon these measurements, a new profile is defined for the new media type.

It is further noted that the present invention may be embodied in the form of a "computer-readable medium". As used herein, the phrase "computer readable medium" can refer to any medium that can contain, store or propagate computer executable instructions. Thus, in this document, the phrase "computer-readable medium" may refer to a medium such as an optical storage device (e.g., a CD ROM) or a magnetic storage device (e.g., a magnetic tape).

Thus, a memory component (e.g., the host memory 218 or the printing device memory 308) that stores computer executable instructions (e.g., the set-up utility 220 or the printer control module 312) may represent an embodiment of the invention. Furthermore, signals used to propagate the firmware over a communication link (e.g. an intranet, Public Internet, etc) may also represent an embodiment of the invention.

Although several specific embodiments of the invention have been described and illustrated, the invention is not to be limited to specific forms or arrangements of parts so described and illustrated. For example, some or all of the functionality of the host computer 204, 804 described above may be moved to another device. For example, in various implementations, the reference media table 222 may be located on a remote server or on the printer 206, for example. Also, the printer 806 may provide the Wizard GUI (via a local control panel) instead of the host computer 804. Also, in various implementations, the host computer (or some other device) may store the characterization target instead of the printer.

The invention is limited only by the claims and the equivalents thereof.

The invention claimed is:

1. In a printer having a colorimeter that does not include a reference tile, a method comprising:
   automatically calibrating the colorimeter using a first print medium of a first media type, wherein the calibrating step includes:
   transporting the first print medium from a first media tray to the colorimeter;
   measuring, by use of the colorimeter, a color of the first print medium;
   using the measured color of the first print medium and a pre-determined description of the first print medium color to calibrate the colorimeter;
   immediately following the calibration of the colorimeter, automatically printing a characterization target on a set of media each of a second media type, where the characterization target comprises a set of color fields;
   using the calibrated color measurement system to measure a color of each color field in the printed characterization target so as to generate a set of color field measurements; and
   using the set of color field measurements to define a color transform for use when printing to the second media type.

2. The method of claim 1, further comprising:
   immediately following the calibration of the colorimeter, automatically performing steps in a characterization procedure to define a color transform for use when printing to a second media type.

3. The method of claim 1, wherein the printing step obtains the set of media of the second media type from the first media tray.

4. The method of claim 3, wherein the first media type is different than the second media type.

5. The method of claim 1, wherein the printer is a laser printer or an inkjet printer.

6. In a printer that includes a color measurement system, a method comprising;
   transporting the first print medium from a first media tray to the color measurement system;
   measuring, by use of the color measurement system, a color of the first print medium;
   using the measured color of the first print medium and a pre-determined description of the first print medium color to calibrate the color measurement system;
   immediately following the calibration of the color measurement system, automatically printing a characterization target on a set of media each of a second media type, where the characterization target comprises a set of color fields;
   using the calibrated color measurement system to measure a color of each color field in the printed characterization target; and
   using the color measurement of each color field to define an ICC color profile for use when printing to the second media type; and
   storing the color profile under a user specified name.

7. A method, comprising:
   prompting, by a device, a user to select a reference media type that is to be used by a printer to calibrate a color measurement system;
   receiving, by the device, a user selection of the reference media type;
   prompting, by the device, a user to place a sheet of the reference media type in a media tray of the printer; and
   the printer using the reference media sheet from the media tray to calibrate the color measurement system, wherein calibrating the color measurement system includes:
   transporting the reference media sheet to the color measurement system;
   measuring, by use of the color measurement system, a color of the reference media sheet; and
   using the measured color of the reference media sheet and a pre-determined description of the reference media sheet color to calibrate the color measurement system;
   following calibration of the color measurement system, printing a set of color fields on a second media type;
   measuring, by use of the color measurement system, a color of the color fields; and
   using the measured color of the color fields to define a color profile for use when printing to the second media type.

8. The method of claim 7, wherein the device is a host computer connected to the printer.

9. The method of claim 7, wherein the device is the printer.

10. The method of claim 7, wherein prompting the user to place the sheet of the reference media type in the media tray of the printer includes:
    simultaneously displaying an icon of a single media sheet, an icon of a printer and an icon of an arrow pointing from the media sheet to the printer.

11. The method of claim 7, further comprising:
    in response to a user action, transmitting a message to the printer;
    wherein the printer is responsive to the message by calibrating the color measurement system using the sheet of the reference media type from the media tray to calibrate the color measurement system.

* * * * *

UNITED STATES PATENT AND TRADEMARK OFFICE
CERTIFICATE OF CORRECTION

PATENT NO. : 7,619,771 B2 Page 1 of 1
APPLICATION NO. : 11/046056
DATED : November 17, 2009
INVENTOR(S) : Steve A. Jacob et al.

It is certified that error appears in the above-identified patent and that said Letters Patent is hereby corrected as shown below:

In column 11, line 42, in Claim 6, delete "comprising;" and insert -- comprising: --, therefor.

Signed and Sealed this

Thirty-first Day of August, 2010

David J. Kappos
*Director of the United States Patent and Trademark Office*